UNITED STATES PATENT OFFICE.

D. H. FITCH, JR., OF LITCHFIELD, ILLINOIS.

IMPROVEMENT IN LIQUIDS FOR GALVANIC BATTERIES.

Specification forming part of Letters Patent No. 38,894, dated June 16, 1863.

*To all whom it may concern:*

Be it known that I, D. H. FITCH, Jr., of Litchfield, in the county of Montgomery, in the State of Illinois, have discovered a new and improved compound, which I term "Galvanic Compound," for uniting with the hydrogen disengaged during the action of galvanic batteries; and I do hereby declare that the following is a full and exact description thereof, reference being had to the samples of the ingredients and of the compound contained in bottles, and marked severally "Chlorate of Potassa," "Water," "Sulphuric Acid," and "D. H. Fitch, Jr.'s Galvanic Compound," which accompany this application.

The nature of my discovery consists in producing a compound easily decomposed, both elements of which have a strong affinity for hydrogen. The ingredients of the compound are chlorate of potassa, sulphuric acid, and water. The chlorate of potassa is decomposed by the sulphuric acid liberating chlorous acid, the elements of which have but a feeble affinity for each other, but each element of which has a strong affinity for hydrogen. The water absorbs and holds in solution the chlorous acid.

To enable others skilled in the art to make and use my compound, I will proceed to describe my mode of making and using it.

I take a porous cup of the size and form generally used in what is known as the "Grooe Battery," and into it I put from eight to twelve drams of chlorate of potassa. I next put into it one fluid ounce of water. I then slowly add one fluid ounce of sulphuric acid. It is then ready for use. I use it in connection with the negative plate. I have adopted this mode as being the most convenient, as the compound is made in the same vessel in which it is to be used. It can be made as well in other vessels and in larger quantities by observing the same proportions.

I claim nothing in the form or mechanical construction of the battery.

What I claim as my discovery, and desire to secure by Letters Patent, is—

1. The use of chlorate of potassa, in combination with sulphuric acid and water, for the purpose specified.

2. The use of the salts of chloric acid, in combination with sulphuric acid and water, for the purpose specified, their action being substantially the same as chlorate of potassa.

D. H. FITCH, JR.

Witnesses:
A. KULER,
B. C. BEARDSLEY.